(12) United States Patent
Jones et al.

(10) Patent No.: US 7,678,936 B2
(45) Date of Patent: Mar. 16, 2010

(54) ISOCYANATO TERMINATED PRECURSOR AND METHOD OF MAKING THE SAME

(75) Inventors: Thomas N. Jones, Pinckney, MI (US); Edmund J. Madaj, Manchester, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/842,889

(22) Filed: Aug. 21, 2007

(65) Prior Publication Data

US 2009/0054604 A1    Feb. 26, 2009

(51) Int. Cl.
*C08G 18/12* (2006.01)
*C08G 18/66* (2006.01)
*C08G 18/36* (2006.01)
*C08G 18/76* (2006.01)

(52) U.S. Cl. .................. 560/25; 560/158; 521/159; 521/160

(58) Field of Classification Search .......... None
See application file for complete search history.

(56) References Cited

U.S. PATENT DOCUMENTS

| | | | |
|---|---|---|---|
| 3,620,984 A | 11/1971 | Dahm et al. | |
| 4,742,087 A | 5/1988 | Kluth et al. | |
| 5,229,427 A | 7/1993 | Madaj | |
| 5,710,190 A | 1/1998 | Jane et al. | |
| 6,051,622 A | 4/2000 | Kinkclaar et al. | |
| 6,359,023 B1 * | 3/2002 | Kluth et al. ............. | 521/155 |
| 6,624,244 B2 | 9/2003 | Kurth | |
| 7,211,616 B2 | 5/2007 | Kaszubski et al. | |
| 2002/0099230 A1 | 7/2002 | Ramirez-de-Arellano-Aburto et al. | |
| 2002/0192456 A1 | 12/2002 | Mashburn et al. | |
| 2003/0083394 A1 | 5/2003 | Clatty | |
| 2005/0282921 A1 | 12/2005 | Flanigan et al. | |
| 2007/0123597 A1 | 5/2007 | Perry et al. | |

FOREIGN PATENT DOCUMENTS

| | | |
|---|---|---|
| DE | 1229290 | 11/1966 |
| EP | 1 264 850 A1 | 12/2002 |
| EP | 1 371 673 A1 | 12/2003 |
| EP | 1 712 578 A1 | 10/2006 |
| EP | 1 967 536 A1 | 9/2008 |
| WO | 00/23491 A1 | 4/2000 |
| WO | 2007/127379 A1 | 11/2007 |
| WO | 2007/130524 A1 | 11/2007 |

OTHER PUBLICATIONS

Zoran S. Petrovic et al., "Effect of OH/CO Molar Ratio on Properties of Soy-Based Polyurethane Networks", Journal of Polymers and the Environment, vol. 10, Nos. 112, Apr. 2002, pp. 5-12.

* cited by examiner

*Primary Examiner*—Brian J Davis
(74) *Attorney, Agent, or Firm*—Brooks Kushman P.C.

(57) ABSTRACT

A method of making an isocyanato terminated precursor for polyurethane is disclosed. The method comprises heating an isocyanate containing about two or more isocyanato groups per molecule at a temperature of up to 80 degrees Celsius and at a pressure of about 1 atmosphere. The method further comprises mixing a modified vegetable oil comprising about two or more hydroxyl groups per molecule with the isocyanate at a molar equivalent ratio of at least 2:1 isocyanate to vegetable oil for a predetermined time period to form the isocyanato terminated precursor.

18 Claims, 1 Drawing Sheet

ISOCYANATO TERMINATED PRECURSOR AND METHOD OF MAKING THE SAME

FIELD OF THE INVENTION

The present invention relates to isocyanato terminated precursors and methods of making isocyanato terminated precursors.

BACKGROUND OF THE INVENTION

Due to their widely ranging mechanical properties and their ability to be relatively easily machined and formed, plastic foams and elastomers have found wide use in a multitude of industrial and consumer applications. In particular, polyurethane foams and elastomers have been found to be well suited for many applications. Automobiles, for instance, contain a number of components, such as cabin interior parts, that are comprised of polyurethane foams and elastomers. Such polyurethane foams are typically categorized as flexible, semi-rigid, or rigid foams with flexible foams generally being softer, less dense, more pliable, and more subject to structural rebound subsequent to loading than rigid foams.

Urethanes are formed when isocyanate (NCO) groups (or A-side reactants) react with hydroxyl (OH) and other active hydrogen groups (or B-side reactants). Specifically, a carbamate linkage (or urethane bond) is formed upon the reaction between an isocyanate group and a hydroxyl group. The polyurethane polymer-forming reaction occurs between substances with more than one isocyanate group per molecule (or A-side reactants) and substances with more than one hydroxyl or other active hydrogen group per molecule (B-side reactants). The most common method of polyurethane production is via the reaction of a polyol (a B-side reactant) and an isocyanate (an A-side reactant) which forms the backbone urethane group. A cross-linking agent may also be added. Depending on the desired qualities of the final urethane product, the precise formulation may be varied. Variables in the formulation include the type and amounts of each of the reactants.

Although vegetable-based polyurethane foams have been used in various polyurethane foam markets, the use of vegetable-based polyurethane foam has not gained acceptance in industries, such as the automotive industry. For example, vegetable-based polyurethanes have not been able to meet specification requirements for use in automotive interior components.

Thus, there is a need to provide a high quality polyurethane product made from a relatively high level of bio-based raw materials.

BRIEF SUMMARY OF THE INVENTION

The present invention generally provides an isocyanato terminated precursor to be used in making a relatively high quality polyurethane product. The isocyanato terminated precursor is made from a relatively high level of bio-based raw materials. In accordance with another example of the present invention, the isocyanato terminated precursor may be then used as the A-side reactant to make a polyurethane product or foam. The isocyanato terminated precursor may be reacted with a B-side reactant from standard petrochemical polyether polyols to produce a relatively high quality polyurethane foam. Depending on the choice of polyols, the foam is suitable for a number of applications ranging from automotive seating to rigid structural urethane parts.

In one example, the present invention provides a method of making an isocyanato terminated precursor for polyurethane. The method comprises heating an isocyanate containing about two or more isocyanato groups per molecule at a temperature of up to 80 degrees Celsius and at a pressure of about 1 atmosphere. The method further comprises mixing a modified vegetable oil comprising about two or more hydroxyl groups per molecule with the isocyanate at a molar equivalent ratio of at least 2:1 isocyanate to vegetable oil for a predetermined time period to form the isocyanato terminated precursor.

In another example, the method comprises heating an isocyanate containing about two or more isocyanato groups per molecule to a temperature of between about 40 and 70 degrees Celsius at a pressure of about 1 atmosphere. The method further comprises adding a modified vegetable oil comprising about two or more hydroxyl groups per molecule to the isocyanate at a molar equivalent ratio of at least 2:1 of isocyanate to vegetable oil. The modified vegetable oil has a temperature of between about 25 and 70 degrees Celsius. The method further comprises mixing the modified vegetable oil with the isocyanate for a predetermined time period to react the modified vegetable oil with the isocyanate to form the isocyanato terminated precursor. The method further comprises cooling the isocyanato terminated precursor to room temperature.

In another example, the present invention provides a compound of formula A as follows:

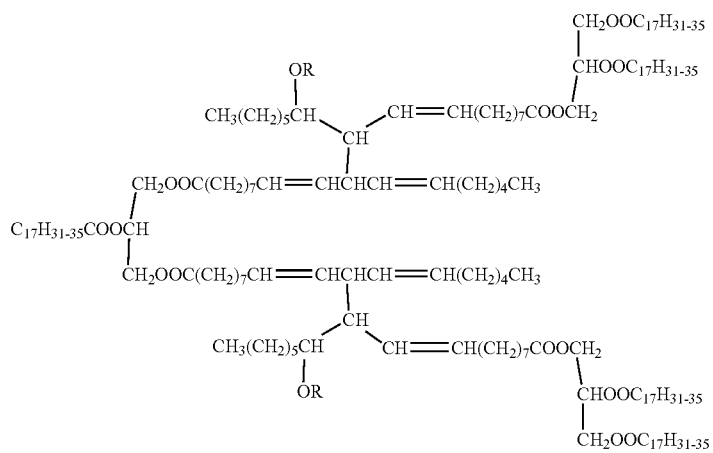

wherein the moiety exclusive of the R groups is derived from polymerized, oxidized soybean oil, CAS# 68152-81-8, and R is

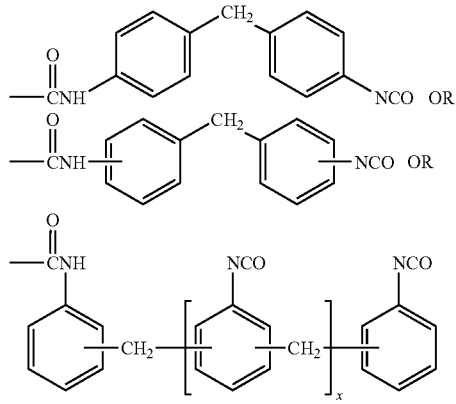

each of which are terminal isocyanato groups derived from 1,1'-methylenebis[4-isocyanatobenzene] CAS# 101-68-8, 1,1'-methylenebis[isocyanatobenzene] CAS# 26447-40-5 and isocyanic acid, polymethylenepolyphenylene ester (polymethylenepolyphenylene isocyanate) CAS# 9016-87-9 respectively.

In yet another example, the present invention provides a method of making a polyurethane product from an isocyanato terminated precursor. The method comprises heating an isocyanate containing about two or more isocyanate groups per molecule to a temperature of between about 25 and 70 degrees Celsius at a pressure of about 1 atmosphere and adding a modified vegetable oil comprising about two or more hydroxyl groups per molecule to the isocyanate at a molar equivalent ratio of at least 2:1 of isocyanate to vegetable oil. The modified vegetable oil has a temperature of between about 25 and 70 degrees Celsius. The method further comprises mixing the modified vegetable oil with the isocyanate for a predetermined time period to react the modified vegetable oil with the isocyanate to form the isocyanato terminated precursor.

In this example, the method further comprises mixing a base polyol with a catalyst and an additive in a weight ratio with the isocyanato terminated precursor so that the active hydrogen content of the polyol mixture in equivalent units is between about 80:100 and 100:60 to the isocyanate equivalent units in the isocyanate precursor. The base polyol with the catalyst and additive are mixed with the isocyanato precursor at a predetermined pressure and a temperature of between about 20 and 50 degrees Celsius, defining a liquid polyurethane mixture. The method further comprises reacting the polyurethane mixture in situ to form the polyurethane product.

Further aspects, features, and advantages of the invention will become apparent from consideration of the following description and the appended claims when taken in connection with the accompanying drawings.

DETAILED DESCRIPTION OF THE INVENTION

Figure 1A:
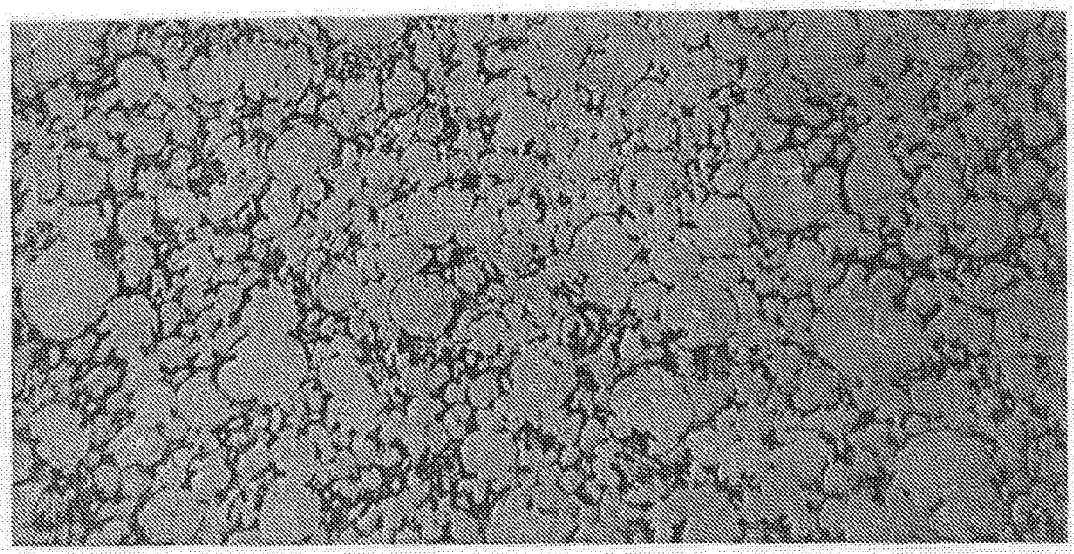
FIG. 1a is a micrograph of a prior art polyurethane foam made from 1,1'-methylenebis[isocyanatobenzene] based isocyanate.

Examples of the present invention provide an isocyanato terminated precursor, methods of making an isocyanato terminated precursor for polyurethane, and methods of making a polyurethane foam from an isocyanato terminated precursor. In one example, hydroxyl groups (—OH) on a polymerized, oxidized soybean oil precursor substance that contains about two or more hydroxyl groups per molecule react with isocyanato groups (—NCO) on isocyanato-containing precursors that contains about two or more isocyanato groups per molecule defining an isocyanato terminated precursor containing less petroleum-based hydrocarbons. This reaction also forms carbamate linkages (—NHCOO—). The isocyanato groups are used in large excess so that molecules of the isocyanato terminated precursor (a new chemical substance) contain, on average, two carbamate groups and at least two isocyanato groups.

In accordance with one example, the present invention provides a method of making an isocyanato terminated precursor for polyurethane. The method comprises providing an isocyanate. In one embodiment, the isocyanate may be any suitable isocyanate such as one of 1,1'-methylenebis[isocyanatobenzene] (MDI), polymethylenepolyphenylene isocyanate (polymeric MDI), and toluene diisocyanate (TDI). Other isocyanates may be used without falling beyond the scope or spirit of the present invention. The isocyanate is heated to a temperature of up to 80 degrees Celsius, preferably between about 25 and 70 degrees Celsius, and more preferably between about 50 and 55 degrees Celsius at a pressure of preferably about 1 atmosphere.

The method further comprises providing a modified vegetable oil comprising hydroxyl groups. For example, the modified vegetable oil may be any suitable oil having hydroxyl groups such as a modified soybean oil (polymerized, oxidized), palm oil, canola oil, rapeseed oil, castor oil, or olive oil. Any other modified non-petroleum based oil may be used without falling beyond the scope or spirit of the present invention.

In this example, up to about 0.002 weight percent phosphoric acid at room temperature is added to the isocyanate containing about two or more isocyanato groups per molecule and then the modified vegetable oil comprising about two or more hydroxyl groups per molecule is added to the isocyanate at a molar equivalent ratio of at least 2:1 of isocyanate to modified vegetable oil. Preferably, the modified vegetable oil is at a temperature of up to about 80 degrees Celsius, more preferably between about 25 and 70 degrees Celsius and most preferably between about 55 and 60 degrees Celsius. However, it is to be noted that the modified vegetable oil may be at room temperature when added to the isocyanate.

In this example, the modified vegetable oil is a modified soybean oil (polymerized, oxidized). Soybean oil, and other plant based oils, is a mixture of triglycerides, i.e., triesters of glycerol and fatty acids. A triglyceride may have the general structure as follows:

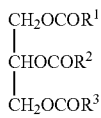

where $R^1$, $R^2$, and $R^3$ can have any of a number of structures. A naturally occurring triglyceride typically exists as a mixture of different structures in which $R^1$, $R^2$, and $R^3$ vary from structure to structure.

A fatty acid is a carboxylic acid and may have a general formula of $HO_2CR$, where R is usually an unbranched aliphatic chain attached to a carboxyl group. The chain may contain double or triple bonds. Other functional groups may also be present, such as hydroxyl groups, as in ricinoleic acid.

The most common R groups in vegetable oils are listed in Table 1 below as follows:

TABLE 1

| R | Name of Fatty Acid Containing R |
|---|---|
| $(CH_2)_2CH_3$ | Butyric |
| $(CH_2)_4CH_3$ | Caproic |
| $(CH_2)_6CH_3$ | Caprylic |
| $(CH_2)_8CH_3$ | Capric |
| $(CH_2)_{10}CH_3$ | Lauric acid |
| $(CH_2)_{12}CH_3$ | Myrisite |
| $(CH_2)_{14}CH_3$ | Palmitic |
| $(CH_2)_{16}CH_3$ | Stearic |
| $(CH_2)_{18}CH_3$ | Arachidic |
| $(CH_2)_{20}CH_3$ | Behenic |
| $(CH_2)_7CH{=}CH(CH_2)_3CH_3$ | Myristoleic |
| $(CH_2)_7CH{=}CH(CH_2)_5CH_3$ | Palmitoleic |
| $(CH_2)_7CH{=}CH(CH_2)_7CH_3$ | Oleic |
| $(CH_2)_7CH{=}CHCH_2CH{=}CH(CH_2)_4CH_3$ | Linoleic |
| $(CH_2)_7CH{=}CHCH_2CH{=}CHCH_2CH{=}CHCH_2CH_3$ | Linolenic |
| $(CH_2)_3CH{=}CHCH_2CH{=}CHCH_2CH{=}CHCH_2CH{=}CH(CH_2)_4CH_3$ | Arachidonic |
| $(CH_2)_7CH{=}CHCH_2CH(OH)(CH_2)_5CH_3$ | Ricinoleic |

It is to be noted that Table 1 is not exhaustive and that a number of other fatty acids may be present in triglycerides without falling beyond the scope or spirit of the present invention.

When a plant based oil is exposed to oxidizing agents, especially with added heat or ultraviolet light, the R groups can react to form a number of other structures. The positions of double bonds may change, and polymerization may occur via free radical, ionic, or electrocyclic reactions. Hydroxyl groups may also be introduced into the molecule.

The chemical structure of oxidized, polymerized soybean oil may be generally described as follows:

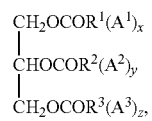

where $R^1$, $R^2$, and $R^3$ are groups derived from the original R groups of the starting triglyceride; $A^1$, $A^2$, and $A^3$ are chemically bonded to $R^1$, $R^2$, and $R^3$, and may be hydroxyl or other triglyceride moieties whose R groups themselves may have undergone similar reactions to those undergone by $R^1$, $R^2$, and $R^3$; and x, y, and z may be any whole number 0 or above, but will usually be 0, 1, or 2. Moreover, if x is 2 or greater, $A^1$ may represent two or more different groups, for example, a hydroxyl group and a triglyceride moiety, or a triglyceride moiety that contains hydroxyl groups. Furthermore, the same is for y and z.

Examples of structures generally having the above description include as follows, but are not limited to:

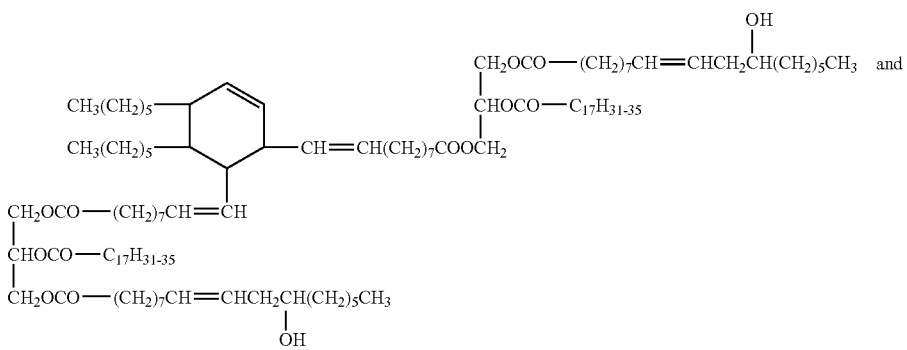

-continued

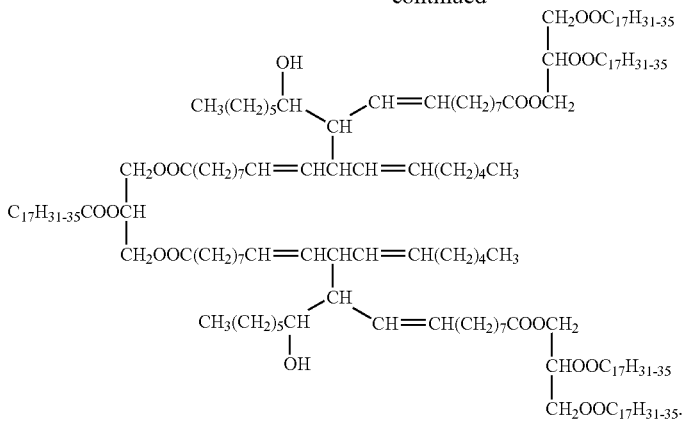

More specifically, the modified soybean oil (polymerized, oxidized) may be Soyol™ R2-052, a di-functional, 52 hydroxyl number biobased polyol suitable for urethane applications and manufactured by Urethane Soy Systems Company of Volga, S. Dak.

The modified vegetable oil is then mixed with the isocyanate for a predetermined time period. The predetermined time period is dependent on whether a catalyst is used during the mixing. A catalyst may be added. If no catalyst is used, then the predetermined time period may range between 1 and 3 hours or more as needed. However, if a catalyst is used during mixing of the modified vegetable oil with the isocyanate, then the predetermined time period may be substantially reduced to less than about 1 hour.

As mentioned above, catalyst(s) may be used in accordance with one example of the present invention. The catalysts added may include tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane (DABCO), N-methyl-N'-dimethylaminoethylpiperazine, N,N-dimethyl-benzylamine, bis-(N,N-diethylaminoethyl) adipate, N,N-diethylbenzylamine, pentamethyl diethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole, 3-[2-(dimethylamino)ethoxy]-N,N-dimethylpropylamine, N,N,N',N'-tetramethyl-2,2'-oxybis(ethylamine), 2,4,6-tris(dimethylaminomethyl)phenol, 1,3-bis (dimethylamino)-2-propanol, diazabicyclo[5.4.0]undec-7-ene (DBU) and the like.

Also useful are commercially available delayed action catalysts such as 1-(2-hydroxypropyl)imidazole formic acid salt; 2-[[2-(dimethylamino)ethyl]methylamino]ethanol formic acid salt; bis(2-dimethylaminoethyl)ether formic acid salt; N,N,N',N'-tetramethyl-1,2-ethanediamine formic acid salt; 1,8-diazabicyclo[5.4.0]undec-7-ene 2-ethylhexanoic acid salt; 1,8-diazabicyclo[5.4.0]undec-7-ene phenol salt; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalysts which include tertiary amines having hydrogen atoms reactive with isocyanate groups include triethanolamine, triisopropanolamine, N-methyldiethanolamine, N-ethyldiethanolamine, N,N-dimethylethanolamine and their reaction products with alkylene oxides such as propylene oxide and/or ethylene oxide.

Basic nitrogen compounds such as tetraalkylammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin (II) salts such as tin(II) acetate, tin(II) octoate, tin(II) ethyl hexoate and tin(II) laurate; and tin(IV) compounds such as dibutyl tin oxide, dibutyl tin dichloride, dibutyl tin diacetate, dibutyl tin dilaurate, dioctyl tin dilaurylmercaptide, dibutyl tin maleate, dioctyl tin diacetate, dimethyl tin dichloride, dimethyl tin dilaurate, or dimethyl tin dilauryl mercaptide. All the above-mentioned catalysts may, of course, be used as mixtures.

Salts of other metals may also be used as catalysts, in particular, organobismuth compounds such as bismuth 2-ethylhexanoate, bismuth neodecanoate and the like, organozirconium compounds such as tetrakis(2,4-pentanedionato)zirconium and the like, or organomercury compounds such as phenyl mercuric neodecanoate and the like.

Further examples of catalysts that may be used in accordance with one example of the present invention are described in Kunststoff-Handbuch, Volume VII, published by Vieweg and Hochtlen, Carl-Hanser-Verlag, Munich 1966, pages 96 to 102, each of which are incorporated herein by reference in its entirety.

The catalysts, when used, are generally used in a quantity of between about 0.001 and 10%, by weight, based on the quantity of polyol.

Any other suitable catalyst may be used. For example, catalysts are listed in U.S. Pat. Nos. 5,229,427 and 7,211,616, each of which is incorporated herein by reference in its entirety.

As mentioned above, the modified vegetable oil is mixed with the isocyanate for a predetermined time period to react the modified vegetable oil with the isocyanate. This forms the isocyanato terminated precursor. A catalyst (listed above) may be added. If no catalyst is used, then the predetermined time period may range between 1 and 3 hours or more as needed. However, if a catalyst is added, then the predetermined time period may be substantially reduced to less than about 1 hour. Mixing continues during the reaction time period and the reaction temperature is maintained at up to 80 degrees Celsius, more preferably between about 25 and 70 degrees Celsius, and most preferably between about 55 and 60 degrees Celsius.

Optionally, additional isocyanate is added to and mixed therewith. For example, up to about 90 weight percent 1,1'-methylenebis[isocyanatobenzene] (monomeric MDI, e.g., MONDUR ML™ by Bayer MaterialScience) or up to about 90 weight percent polymethylenepolyphenylene ester (e.g., PAPI 94™ by Dow Chemical Company) at about room temperature or higher may be added and mixed therewith.

The mixing reacts the modified vegetable oil with the isocyanate to form the isocyanato terminated precursor in a reaction as follows:

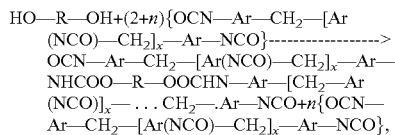

wherein x is greater than or equal to 0 and wherein n is greater than or equal to 0.

Mixing is preferably continued for the predetermined time period or about 30 minutes or more. Heating is stopped and the resulting isocyanato terminated precursor is cooled down to 35 to 40 degrees Celsius. The isocyanato terminated precursor is cooled down to room temperature.

As discussed in greater detail below, the isocyanato terminated precursor may be then used as the A-side reactant with a B-side reactant using standard petrochemical polyether polyols. It has been found that this produces a relatively high quality polyurethane foam. Depending on the choice of polyols, the foam is suitable for a number of applications ranging from automotive seating to rigid structural urethane parts.

In another example, the present invention provides a method of making a polyurethane product from an isocyanato terminated precursor. Polyurethane foam may be prepared by reacting what is known as an A-side reactant with what is known as a B-side reactant. The A-side reactant is generally considered to include at least one isocyanate. The B-side reactant generally comprises a solution or mixture of an isocyanate-reactive component, such as a polyol.

The method comprises forming the isocyanato terminated precursor as described herein. The isocyanato terminated precursor may be used as the A-side reactant. The method further comprises mixing a base polyol with a catalyst (mentioned above) and optionally any additive to define a polyol mixture. The polyol mixture may be used as the B-side reactant. The polyol mixture may have a weight ratio with the isocyanato terminated precursor so that the active hydrogen content of the polyol mixture in equivalent units is between about 80:100 and 100:60 to the isocyanato equivalent units in the isocyanate precursor.

In this example, the polyol mixture (the base polyol with the catalyst and optional additive) is then mixed with the isocyanato precursor at a predetermined pressure and a temperature of between about 20 and 50 degrees Celsius, defining a liquid polyurethane mixture. In one example, the predetermined pressure may be up to about 2 atmospheres, depending on the apparatus. However, in another example, the predetermined pressure may be between about 1500 and 3000 pounds per square inch gauge.

The liquid polyurethane mixture may then be injected or poured in a cavity of a mold. The polyurethane mixture reacts in situ to form the polyurethane product. That is, in the cavity, the reacting liquid polyurethane mixture in foam formulations rises to fill the cavity and then cures to a solid structure to form the polyurethane product in situ. For non-foam formulations, the liquid polyurethane mixture fills the cavity to the volume injected or poured and then cures to a solid to form the polyurethane product in situ. In these examples, the mold may be made of aluminum, polymeric material, or steel, or any other suitable material. After a defined period of time, the polyurethane product is removed from the mold retaining the predetermined shape.

Figure 1B:
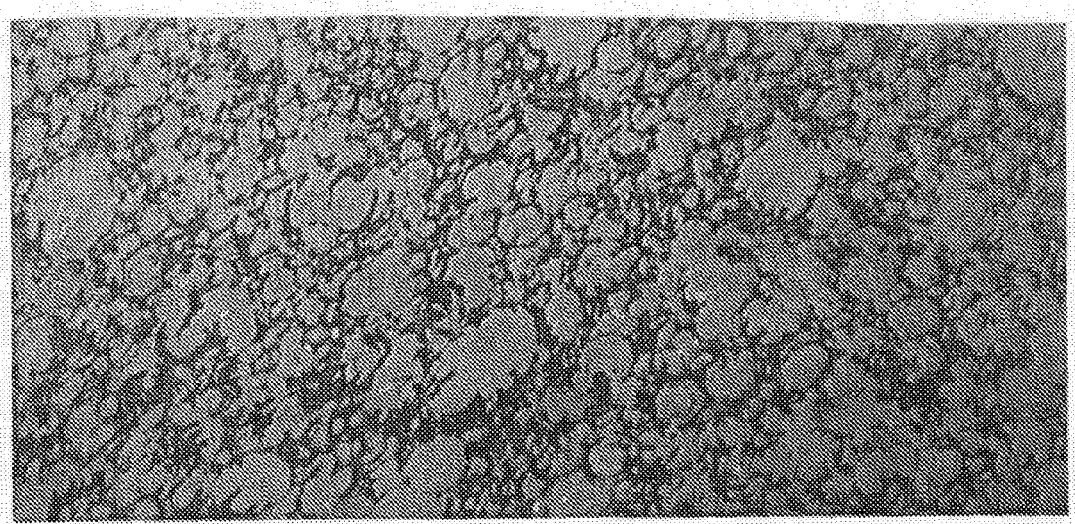
FIG. 1b is a micrograph of a polyurethane foam made from an isocyanato terminated precursor in accordance with one example of the present invention.

FIGS. 1a and 1b illustrate a comparison between a prior art polyurethane foam and a polyurethane foam made in accordance with an example of the present invention. FIG. 1a depicts a prior art polyurethane foam made from made from an MDI based isocyanate produced from petrochemical polyurethane materials. FIG. 1b illustrates an example of the present invention where the polyurethane foam is produced with the isocyanato terminated precursor. These images confirm that the cell structures of both foams are similar in size and uniformity. Furthermore, both foams have identical feel, resilience and appearance.

EXAMPLE

This example provides a method of making an isocyanate terminated precursor to be used in making a polyurethane product. About 15 weight percent of a modified soybean oil (polymerized, oxidized), Soyol™ R2-052, from Urethane Soy Systems Company of Volga, S. Dak. was weighed into a clean dry open head drum. The open head drum was then sealed with a lid and preheated to between about 50 and 55 degrees Celsius. The weight percent of water in the modified soybean oil was measured and was confirmed to be less than about 0.10 weight percent maximum.

About 28 weight percent of molten 1,1'-methylenebis[4-isocyanatobenzene] (MDI) labeled MONDUR M™ by Bayer MaterialScience and about 8 weight percent of polymethylenepolyphenylene isocyanate (polymeric MDI) labeled PAPI 94™ by Dow Chemical Company were loaded in a clean, dry 55 gallon kettle reactor equipped with heater pads and an agitator mounted on the lid of the reactor. The reactor was "padded" or "blanketed" with dry nitrogen prior to charging the reactor and during the ongoing reaction described below.

The isocyanates (MDI and polymeric MDI) were mixed under moderate agitation conditions and heated to a temperature of between about 50 and 55 degrees Celsius at a pressure of about 1 atmosphere. About 0.001 weight percent phosphoric acid (about 86 weight percent phosphoric acid in solution) at room temperature was added to the reactor.

Moderate agitation was continued while the modified soybean oil was loaded in the reactor. Moderate agitation was maintained defining a reaction batch. The reaction batch was continuously mixed for about 3 hours at a maintained temperature of between about 55 and 60 degrees Celsius. After about 3 hours of agitation, additionally about 18.5 weight percent 1,1'-methylenebis[isocyanatobenzene] and about 30 weight percent polymeric MDI was loaded to the reaction batch. The reaction batch was mixed for 30 to 45 minutes.

The reaction batch was cooled to between about 34 and 40 degrees Celsius and was then filtered through a 150 micron bag filter. A 40 mesh screen was an alternate filter. The isocyanato terminated precursor was collected. The isocyanato terminated precursor was ready to be used in making a polyurethane product.

While the present invention has been described in terms of preferred embodiments, it will be understood, of course, that the invention is not limited thereto since modifications may be made to those skilled in the art, particularly in light of the foregoing teachings.

The invention claimed is:

1. A method of making an isocyanato terminated precursor for polyurethane, the method comprising:
heating an isocyanate containing about two or more isocyanato groups per molecule at a temperature of up to 80 degrees Celsius and at a pressure of about 1 atmosphere; and
mixing a modified vegetable oil comprising about two or more hydroxyl groups per molecule with the isocyanate at a molar equivalent ratio of at least 2:1 isocyanate to vegetable oil for a predetermined time period to form the isocyanato terminated precursor, wherein the modified vegetable oil comprises a polymerized, oxidized vegetable oil.

2. The method of claim 1 wherein the isocyanate is at least one of 1,1'-methylenebis[isocyanatobenzene], polymethylenepolyphenylene isocyanate, and any isomer or isomer ratio of toluene diisocyanate.

3. The method of claim 1 wherein mixing comprises:
adding the modified vegetable oil comprising hydroxyl groups to the isocyanate;
reacting the modified vegetable oil with the isocyanate to form the isocyanato terminated precursor; and
mixing additional isocyanate with the isocyanate terminated precursor.

4. The method of claim 1 wherein the modified vegetable oil and the isocyanate have temperatures of between about 25 and 70 degrees Celsius.

5. The method of claim 1 further comprising cooling the isocyanato terminated precursor to room temperature.

6. The method of claim 1 wherein mixing reacts the modified vegetable oil with the isocyanate to define the isocyanato terminated precursor in a reaction as follows:

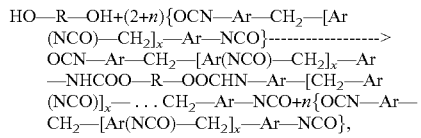

HO—R—OH+(2+n){OCN—Ar—CH$_2$—[Ar(NCO)—CH$_2$]$_x$—Ar—NCO}------------------>
OCN—Ar—CH$_2$—[Ar(NCO)—CH$_2$]$_x$—Ar—NHCOO—R—OOCHN—Ar—[CH$_2$—Ar(NCO)]$_x$—...CH$_2$—Ar—NCO+n{OCN—Ar—CH$_2$—[Ar(NCO)—CH$_2$]$_x$—Ar—NCO}, wherein x is greater than or equal to 0 and wherein n is greater than or equal to 0.

7. The method of claim 1 further comprising:
adding up to about 0.002 weight percent phosphoric acid at room temperature; and
adding a catalyst at room temperature.

8. The method of claim 1 further comprising adding up to about 90 weight percent 1,1'-methylenebis[isocyanatobenzene] at room temperature or higher.

9. The method of claim 1 further comprising adding up to about 90 weight percent polymethylenepolyphenylene isocyanate at room temperature or higher.

10. A method of making an isocyanate precursor for polyurethane, the method comprising:
heating an isocyanate containing about two or more isocyanato groups per molecule to a temperature of between about 40 and 70 degrees Celsius at a pressure of about 1 atmosphere; and
adding a modified vegetable oil comprising about two or more hydroxyl groups per molecule and a hydroxyl number of about 52 to the isocyanate at a molar equivalent ratio of at least 2:1 of isocyanate to vegetable oil, the modified vegetable oil having a temperature of between about 25 and 70 degrees Celsius;
mixing the modified vegetable oil with the isocyanate for a predetermined time period to react the modified vegetable oil with the isocyanate to form the isocyanato terminated precursor; and
cooling the isocyanato terminated precursor to room temperature.

11. The method of claim 10 further comprising:
adding up to about 0 to 0.002 weight percent phosphoric acid at room temperature;
adding up to about 90 weight percent 1,1'-methylenebis[isocyanatobenzene] at room temperature or higher; and
adding up to about 90 weight percent polymethylenepolyphenylene isocyanate at room temperature or higher.

12. The method of claim 10 wherein the isocyanate is 1,1'-methylenebis[isocyanatobenzene], polymethylenepolyphenylene isocyanate, and any isomer or isomer ratio of toluene diisocyanate.

13. The method of claim 10 wherein mixing reacts the modified vegetable oil with the isocyanate to define the isocyanato terminated precursor in a reaction as follows:

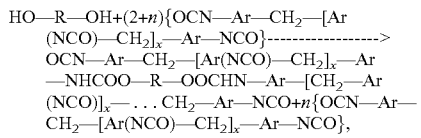

HO—R—OH+(2+n){OCN—Ar—CH$_2$—[Ar(NCO)—CH$_2$]$_x$—Ar—NCO}------------------>
OCN—Ar—CH$_2$—[Ar(NCO)—CH$_2$]$_x$—Ar—NHCOO—R—OOCHN—Ar—[CH$_2$—Ar(NCO)]$_x$—...CH$_2$—Ar—NCO+n{OCN—Ar—CH$_2$—[Ar(NCO)—CH$_2$]$_x$—Ar—NCO}, wherein x is greater than or equal to 0 and wherein n is greater than or equal to 0.

14. The method of claim 10 further comprising adding a catalyst at room temperature.

15. The method of claim 1 wherein prior to the mixing step, the isocyanate is heated to a temperature of between 40 to 70 degrees Celsius at a pressure of about 1 atmosphere, and the modified vegetable oil is heated to a temperature of between 25 and 70 degrees Celsius.

16. The method of claim 10 wherein the mixing step take place after the adding step.

17. The method of claim 10, wherein the modified vegetable oil comprises a polymerized, oxidized vegetable oil.

18. A method of making an isocyanato terminated precursor for polyurethane, the method comprising:
heating a first amount of isocyanate containing about two or more isocyanato groups per molecule;
mixing a modified vegetable oil comprising about two or more hydroxyl groups per molecule with the isocyanate at a molar equivalent ratio of at least 2:1 isocyanate wherein the modified vegetable oil comprises a polymerized, oxidized vegetable oil;
reacting the modified vegetable oil with the first amount of isocyanate to form an isocyanato terminated precursor; and
mixing a second amount of isocyanate with the isocyanate terminated precursor.

* * * * *